United States Patent [19]

McDonald et al.

[11] Patent Number: 5,425,270

[45] Date of Patent: Jun. 20, 1995

[54] VALVE DIAGNOSTIC ENVIRONMENTAL DATA ACQUISITIONER

[75] Inventors: Francis X. McDonald, Enfield; Edward A. Siegel, West Hartford, both of Conn.

[73] Assignee: Combustion Engineering, Inc., Windsor, Conn.

[21] Appl. No.: 334,459

[22] Filed: Nov. 4, 1994

Related U.S. Application Data

[63] Continuation of Ser. No. 121,776, Sep. 15, 1993, abandoned.

[51] Int. Cl.$^6$ .................. G01M 19/00; G01L 5/00; F16K 37/00
[52] U.S. Cl. .................. 73/168; 137/487.5; 137/552; 364/551.01; 364/558
[58] Field of Search ............ 73/168; 137/551, 487.5, 137/552; 364/558, 550, 556, 551.01

[56] References Cited

U.S. PATENT DOCUMENTS

| | | | |
|---|---|---|---|
| 2,924,971 | 2/1960 | Schroeder et al. | 73/168 |
| 3,779,457 | 12/1973 | Cornyn, Jr. et al. | 73/168 |
| 4,805,451 | 2/1989 | Leon | 73/168 |
| 4,896,101 | 1/1990 | Cobb | 73/168 |
| 5,056,046 | 10/1991 | Mutchler et al. | 73/168 |
| 5,109,692 | 5/1992 | Fitzgerald | 73/168 |
| 5,231,469 | 7/1993 | Jeffers et al. | 356/373 |
| 5,272,647 | 12/1993 | Hayes | 73/168 |

FOREIGN PATENT DOCUMENTS

| | | |
|---|---|---|
| 2194648 | 3/1988 | United Kingdom . |
| 8704244 | 7/1987 | WIPO ................. 73/168 |

*Primary Examiner*—Diego F. F. Gutierrez
*Attorney, Agent, or Firm*—L. James Ristas; John H. Mulholland

[57] ABSTRACT

A data acquisition system (1) by which environmental parameters proximate to plant installed valves (2) may be monitored, recorded and correlated with other valve operating data. The system includes sensors (8) for sensing environmental parameters such as gas/vapor concentration, temperature or humidity. The system also includes sensors for sensing changes in the actuating variable (34) and sensors for sensing valve stem displacement (58). The sensors (8, 34, 6) generate electrical signals proportional to the value of the sensed parameter. First data interface equipment (32, 42, 43) is provided for digitizing the sensed actuating variable as the actuating variable is changed to displace the stem, preferably a full stroke from the open-to-close-to-open positions or vice versa. Second data interface equipment (7, 45) is provided for digitizing the sensed environmental parameter as the stem is displaced. Third data interface equipment (6, 45) is provided for digitizing the sensed stem displacement. The digitized data are stored, preferably with a computer (45) and associated random access memory, and can later be uploaded for use in, for example, a plant database system or correlated to evaluate valve operability.

25 Claims, 2 Drawing Sheets

VALVE DIAGNOSTIC ENVIRONMENTAL DATA ACQUISITIONER

This is a continuation of application Ser. No. 121,776 filed Sep. 15, 1993, now abandoned.

BACKGROUND OF THE INVENTION

The present invention relates to the testing of valves, and more particularly, to the acquisition of characteristic environmental data regarding valves in the field.

During the past few years, the nuclear industry has placed increased emphasis on valve operability. One area of concern relates to the effects of adverse environmental factors on valve operability. Additionally, operation of motor-operated valves and stem leakage from all valve types contribute to plant heat and humidity. This can be particularly important in areas accessible by plant personnel, areas containing safety grade process instrumentation and containment. Containment safety analysis may be violated if ambient temperature or humidity exceed the initial conditions assumed in the analysis.

Monitoring temperature and humidity proximate to valves undergoing routine testing provides a means of determining whether valve performance has been affected by a change in these factors. Additionally, an increase in the ambient temperature or humidity immediately adjacent to a valve may indicate excessive stem leakage or motor currents.

The petrochemical industry is required to monitor valve emissions for compliance with the Clean Air Act. Existing technology does not combine the methods of operational valve testing to valve emission testing.

A known approach to valve diagnostics includes operating a valve with a test program while obtaining accurate measurements of, for example, stem thrust or displacement. Such an approach is disclosed in U.S. Pat. No. 5,109,692 (Fitzgerald) which is herein incorporated by reference. By analyzing the relationship of stem thrust, movement, or similar performance variable to the independent energizing variable certain valve behaviors indicative of reliability can be inferred. However, the known approaches do not analyze the relationship between such performance variables and environmental factors to establish valve behaviors indicative of reliability. Additionally, the known approaches do not analyze the relationship between valve emissions and valve performance variables.

SUMMARY OF THE INVENTION

It is thus an object of the present invention to provide a data acquisition system by which environmental parameters proximate to plant installed valves may be monitored and recorded.

It is a particular object of the invention to provide a system for comparing such environmental data to stem displacement and actuating variable data.

It is a further object that such system be portable and readily deployed for use by technicians in the field, without the need to disconnect the valve from the process line.

The system in accordance with the invention includes means for sensing the environmental parameters, means for sensing changes in the actuating variable and means for sensing stem displacement. Means responsive to the environmental sensing means, means responsive to the actuating variable sensing means and means responsive to the stem displacement sensing means are utilized to generate data commensurate with changes in the environmental parameter, actuating variable and stem displacement respectively. First, second and third data interfaces are utilized to digitize the sensed environmental data, actuating variable data and stem displacement. The digitized data are stored, preferably with a computer and associated random access memory, and can later be uploaded for use in, for example, the plant data base system.

In the preferred embodiment for use with pneumatically operated valves, the environmental sensor, stem displacement sensor, air pressure transducer and first, second and third interface means, computer, a keyboard, and a battery power pack are all mounted within a suitcase-size portable box or container. Alternatively, the sensors or other components may be connected to the computer and interface means within the container, but removable during inspection for convenient positioning near the valve.

In a general sense, the invention is directed to a method of acquiring characteristic environmental, pressure and stem displacement data from a pneumatic operated valve, recording such data and correlating the environmental data to the pressure and stem displacement data.

It should be appreciated that valve performance is influenced by ambient temperature and humidity. Changes in valve performance cannot be fully evaluated without comparing test environmental data with base line environmental data. The invention provides a record of the environmental data for comparison to base line data. Additionally, real time recordation of environmental data during valve testing will allow the technician to detect variations in valve performance due to changes in the environmental conditions during testing.

It should be further appreciated that valves emit heat, humidity, gases and vapors that impact the environment. Such emissions will vary over time and with valve usage.

The invention provides a means of systematic recordation of environmental data during valve testing. Such records will provide a basis for establishing maintenance intervals and requirements. Additionally, tile records may be used to satisfy statutory reporting requirements for airborne contaminants for example, carbon dioxide, carbon monoxide, hydrogen chloride, hydrogen flouride or nitrogen dioxide. The records may be used to verify assumptions utilized in nuclear power plant safety analysis and to determine when such assumptions may be violated.

Thus, the present invention is in its most general form, directed to a method of acquiring characteristic data regarding a valve that is connected to a process flow line in a plant, the valve having an actuator, a stem that is displaced in response to a change in the actuating variable, and means responsive to the stem displacement for adjusting the flow through the line, wherein the characteristic data include the environmental data, actuating variable and stem displacement. The key aspect of the invention is recordation of the environmental data and the correlation of the environmental data with the actuating variable and stem displacement data.

The valve data acquisition system in accordance with the invention is capable of obtaining signature traces. Off-nominal conditions of the valve which can affect the acquired data include a bent stem or other sources of excessive friction, deteriorating seals (packing) in the valve or operator, or a change in the zero position, due, for example, to a worn seat.

BRIEF DESCRIPTION OF THE DRAWINGS

These and other objects and advantages of the invention will be described below with reference to the accompanying drawings, in which.

DESCRIPTION OF THE PREFERRED EMBODIMENT

Figure 1:
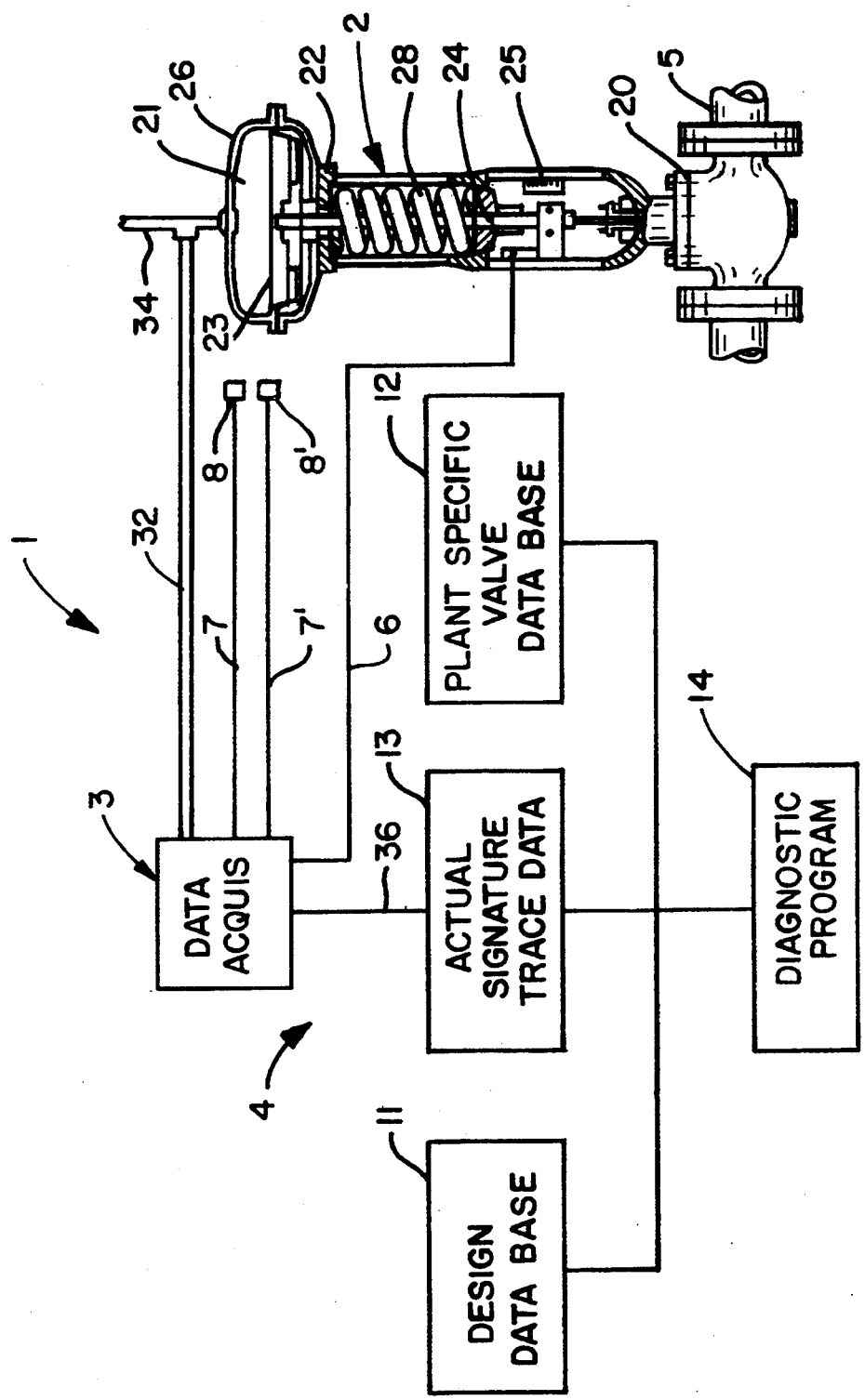
FIG. 1 is a schematic view of a valve database system with which the data acquisition system of the present invention would be employed.

FIG. 1 shows the context in which the present invention finds its most advantageous use. The underlying utility is that environmental data proximate to a valve can be correlated with valve stem displacement data and valve actuating variable data. A plant valve diagnostic system 1 includes a multiplicity of individual valves, one of which is shown at 2, an individual valve data acquisition system 3, and a data analysis system 4.

A pneumatically operated valve 2 is shown connected to a process line 5 in, for example, a nuclear power plant. The valve 2 includes a body 20 containing a sealable passage through which line fluid may flow, and an operator 22 including a stem 24 for positioning sealing means in the passage and an actuator 26 for displacing the stem a stroke distance corresponding to the open and closed position of the sealing means. Typically, whether the valve is designed for an unpressurized open or unpressurized closed condition, the unpressurized or zero condition is maintained at a non-zero pressure to avoid initial lag or zero position drift. Smaller valves typically operate within the range of 3–15 psi, and larger valves in the range of 6–30 psi, with total stroke displacements of the stem ranging from a few inches up to two feet. A spring 28 is typically provided to counterbalance the "zero" pressure of, for example, 3 psi in the chamber 21 which is applied against diaphragm 23 connected to stem 24. A pressure fitting in line 34 is provided for chamber 21, and is connected to a conventional source of pressurized air (not shown).

In FIG. 1, a sensor line 32 is shown having a connection at one end to fitting 34 for sensing the operator pressure, a sensor line 6 is shown generally leading to the valve yoke 25 for sensing the stem displacement and a sensor line 7 is shown generally leading to an environmental sensor 8 located proximate to the valve 2. Alternatively, multiple environmental parameters may be monitored as shown by sensor line 7' and environmental sensor 8'.

Lines 32, 7 and 6, environmental sensor 8 and the associated signal processing and data storage hardware within system 3, constitute the subject matter of the present invention. The technician can use one portable acquisition system 3 to collect data one valve at a time, with the collected data being automatically stored for later downloading, e.g., through line 36 to the actual signature trace data processing 13 of the analysis system 4. The signature or characteristic trace data of a particular valve can be combined with design data contained in block 11 and information about the plant specific valves as contained in block 12, by the diagnostic program to help the plant operator identify valves that need immediate attention, plan a maintenance and replacement strategy, or otherwise monitor the condition of the inventory of on-line valves in the plant.

Figure 2:
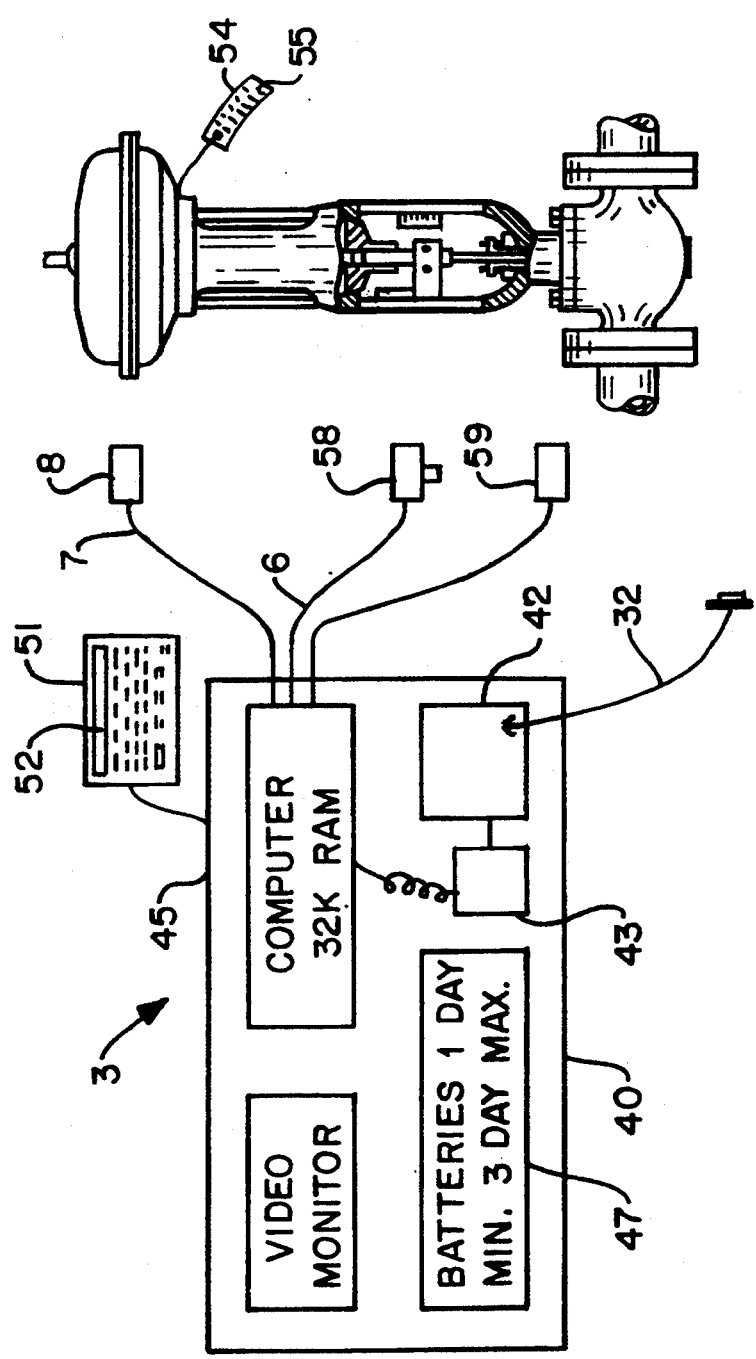
FIG. 2 is a schematic representation of the system in accordance with the present invention in use for acquiring data on a pneumatic operated valve.

FIG. 2 shows the data acquisition system 3 in accordance with the preferred embodiment of the invention. A suitcase-size insulated container 40 preferably carries an air pressure transducer 42 which is connected through line 32 and fitting 34 to the operator 26 of the valve 2 and associated transmitter 43. The pressure transmitter 43 is connected to a computer or processor 45 which includes a digital storage memory, for example, 32K RAM. A battery pack 47 is also carried within the container 40 with sufficient power to operate the computer, transducers and other equipment to be described below, continuously for a period of one to three days.

A human interface such as a keyboard 51 including CPU display 52 is connected to computer 45 and may either be permanently mounted within the container 40 or optionally be carried in the container only when not in use, and connectable through a plug or the like to the computer for use. The keyboard preferably has an alphanumeric set of keys by which the technician can record specific information concerning the appearance or operation of the valve, into the storage memory. Preprogrammed function keys such as "F1" can facilitate such recording.

Any type of stem displacement sensing device 58 is connected to the computer through line 6. Examples are described in U.S. Pat. Nos. 5,056,046 and 5,231,469.

As a reliable technique for assuring that the measured stem displacement will be associated with the correct valve, a bar code reader 59 coupled to the computer 45 can be used to scan an attached marker 54, thereby acquiring valve identification from the bar code 55. This also assures that the code must be scanned by the technician; the technician cannot use "old" data.

The identification data can be required as a prerequisite to the initiation of the environmental, pressure and displacement data, by means of control through the keyboard 51. The keyboard can be used for setting the rate at which the pressure and displacement data are sensed and/or stored. Furthermore, the keyboard can provide for setting the duration of time during which data are generated and stored.

We claim:

1. A system for acquiring characteristic data of a valve proximate a pneumatic valve connected to a fluid line, the valve having a body containing a sealable passage through which line fluid may flow, an operator including a stem for positioning sealing means in the passage, and a pneumatic pressure actuator for displacing the stem a stroke distance corresponding to the open and closed positions of the sealing means, said system comprising:

means for sensing a contaminant vapor concentration while a pneumatic pressure change is applied to the actuator;

means responsive to the means for sensing a vapor, for generating environmental data commensurate with the magnitude of the sensed vapor concentration;

means for sensing pneumatic pressure in the actuator simultaneously with the sensing of the contaminant vapor concentration as the stem is displaced over the stroke distance;

means responsive to the pressure sensing means, for generating pressure data commensurate with the pneumatic pressure in the actuator as the stem is displaced over the stroke distance;

first data interface means for digitizing the sensed environmental data;

second data interface means for digitizing the sensed pneumatic pressure data; and means for storing the digitized environmental data and pneumatic pressure data.

2. The system of claim 1, further including:

means for sensing stem displacement over the stroke distance;

means responsive to the stroke displacement sensing means for generating stem displacement data commensurate with displacement of the stem resulting from a change in operator pressure; and third data interface means for digitizing the stem displacement data;

wherein the stem displacement data is stored in the data storing means.

3. The system of claim 2, wherein the environmental sensing means comprises means for sensing a concentration off a contaminant vapor selected from the group consisting of carbon dioxide, carbon monoxide, hydrogen chloride, hydrogen fluoride and nitrogen dioxide.

4. The system of claim 2, further comprising means for correlating on a common time scale, said digitized environmental data with said digitized pneumatic pressure data and said digitized stem displacement data.

5. The system of claim 1, wherein the environmental sensing means comprises means for sensing a concentration of a contaminant vapor selected from the group consisting of carbon dioxide, carbon monoxide, hydrogen chloride, hydrogen fluoride and nitrogen dioxide.

6. The system of claim 1, further comprising means for correlating on a common time scale, said digitized environmental data with said digitized pneumatic pressure data.

7. A system for acquiring characteristic data of a valve proximate a pneumatic valve connected to a fluid line, the valve having a body containing a sealable passage through which line fluid may flow, an operator including a stem for positioning sealing means in the passage, and an actuator for displacing the stem a stroke distance corresponding to the open and closed positions of the sealing means, said system comprising:

means for sensing a contaminant vapor concentration while the stem is displaced over the stroke distance;

means responsive to the means for sensing a vapor, for generating environmental data commensurate with the magnitude of the sensed vapor concentration;

means for sensing stem displacement over the stroke distance;

means responsive to the stroke displacement sensing means for generating stem displacement data commensurate with displacement of the stem resulting from a change in operator pressure;

first data interface means for digitizing the sensed environmental data;

second data interface means for digitizing the stem displacement data; and means for storing the digitized environmental data and stem displacement data.

8. The system of claim 7, wherein the environmental sensing means comprises means for sensing a concentration of a contaminant vapor selected from the group consisting of carbon dioxide, carbon monoxide, hydrogen chloride, hydrogen fluoride, and nitrogen dioxide.

9. The system of claim 7, further comprising means for correlating on a common time scale, said digitized environmental data with said digitized stem displacement data.

10. A system for acquiring characteristic data regarding a device connected to an industrial process, the device having a stem and actuator responsive to an actuating variable for displacing the stem over a stroke distance, said system comprising:

means for sensing a contamination vapor emitted from the valve while the actuating variable is displacing the stem;

means responsive to the means for sensing a vapor, for generating environmental data commensurate with the magnitude of the sensed vapor;

means for sensing changes in the actuating variable as the stem is displaced over the stroke distance;

means responsive to the actuating variable sensing means, for generating actuator data commensurate with the actuating variable as the stem is displaced over the stroke distance;

first data interface means for digitizing the sensed environmental data;

second data interface means for digitizing the sensed actuator data; and means for storing the digitized environmental data and actuator data.

11. The system of claim 10, further including:

means for sensing stem displacement over the stroke distance;

means responsive to the stroke displacement sensing means for generating stem displacement data commensurate with displacement of the stem resulting from a change in the actuating variable; and third data interface means for digitizing the stem displacement data, said digitized stem displacement data being storable in said storing means.

12. The system of claim 11, further including a portable container enclosing at least the means for generating environmental data, means for generating actuator data and means for generating stem displacement data; the first, second and third data interface means; and the means for storing the digitized data.

13. The system of claim 12, wherein the means for generating environmental data, means for generating actuator data and means for generating stem displacement data and the first, second and third data interface means are associated with a computer, and the system includes a human interface associated with the computer for setting the rate at which the stored data is acquired.

14. The system of claim 13, wherein the human interface provides for setting the duration of time during which environmental data, actuator data and stem displacement data are generated and stored.

15. The system of claim 14, wherein the human interface means is mounted within the container.

16. The system of claim 15, wherein the environmental sensing means comprises means for sensing a concentration of a contaminant vapor a selected from the group consisting of carbon dioxide, carbon monoxide, hydrogen chloride, hydrogen fluoride and nitrogen dioxide.

17. The system of claim 11, further comprising means for correlating on a common time scale, said digitized environmental data with said digitized actuator data and said digitized stem displacement data.

18. The system of claim 10, wherein the environmental sensing means comprises means for sensing a concentration of a contaminant vapor selected from the group consisting of carbon dioxide, carbon monoxide, hydrogen chloride, hydrogen fluoride and nitrogen dioxide.

19. The system of claim 10, further comprising means for correlating on a common time scale, said digitized environmental data with said digitized actuator data.

20. A method of acquiring characteristic data regarding a valve that is connected to a process flow line in a plant, the valve having an actuator, a stem that is displaced in response to a change in the actuating variable, and means responsive to the stem displacement for adjusting the flow through the line, wherein the characteristic data includes environmental data commensurate with contaminant vapor emission from the valve and at least one of actuating variable data or stem displacement data, the method comprising the steps of:
 acquiring said characteristic data at a plurality of time points during the displacement of the stem;
 digitizing said characteristic data;
 recording said characteristic data; and
 correlating on a common time scale, the environmental data with the at least one of actuating variable data or stem displacement data.

21. A method of acquiring characteristic data regarding a pneumatic valve that is connected to a process flow line in a plant, the valve having a pneumatic pressure chamber, a stem that is displaced over a stroke distance in response to a change in the pressure in the chamber, and means responsive to the stem displacement for adjusting the flow through the line, wherein the characteristic data includes at least one of chamber pressure data or stem displacement data, and environmental parameter data comprising a contaminant vapor concentration, the method comprising the steps of:
 manually transporting a portable data acquisition unit from an arbitrary first location in the plant to a second location near the pneumatic valve, the unit including,
 a displacement sensor for sensing stem displacement over the stroke distance,
 means associated with the stem displacement sensor for generating digital representation of change in stem displacement sensed by the stem displacement sensor,
 a pressure sensor for sensing pneumatic pressure in the pressure chamber as the stem is displaced over the stroke distance,
 means associated with the pressure sensor for generating a digital representation of changes in pressure sensed by the pressure sensor,
 an environmental parameter data sensor for sensing contaminant vapor concentration,
 means associated with the environmental parameter sensor for generating a digital representation of changes in the parameter sensed by the environmental sensor, and
 a human interface for manually setting control parameters for the unit;
 mounting the stem displacement sensor adjacent said valve so that stem displacement is monitored;
 connecting the pressure sensor to the pressure chamber; mounting the environmental sensor adjacent said valve so that environmental data is monitored during the monitoring of the stem displacement;
 setting the interface to
  initiate the generation and storage of digitized data values indicative of the pressure in the chamber,
  initiate the generation and storage of digitized data values indicative of the displacement of the stem,
  initiate the generation and storage of digitized data values indicative of the environmental data comprising contaminant vapor and
 terminating the storage of additional values after a sufficient number of such values have been stored.

22. The method of claim 21, wherein the unit includes a symbolic code reader and the method includes the steps of,
 attaching a symbolic identification code to the valve whereby said code identifies the valve,
 reading the code with the reader, and
 storing the valve identification as a digitized value associated with the environmental, pressure and displacement data values for the valve.

23. The method of claim 21 including the steps of correlating the environmental data to stem displacement data or pneumatic pressure data.

24. A method of acquiring characteristic data regarding a valve that is connected to a process flow line in a plant, the valve having an actuator responsive to an actuating variable, a stem that is displaced over a stroke distance in response to the actuation of the actuator, and means responsive to the stem displacement for adjusting the flow through the line, wherein the characteristic data includes actuating variable data and stem displacement data, and environmental data comprising a contaminant vapor concentration, comprising the steps of:
 positioning a data acquisition unit near the valve, the unit including,
 a displacement sensor for sensing stem displacement over the stroke distance,
 means associated with the stem displacement sensor for generating a digital representation of the value of the stem displacement,
 a sensor for sensing said actuating variable,
 means associated with the actuating variable sensor for generating a digital representation of the value of the actuating variable sensed by the actuating variable sensor,
 an environmental parameter data sensor for sensing a contaminant vapor concentration,
 means associated with the environmental parameter sensor for generating a digital representation of changes in the parameter sensed by the environmental sensor,
 memory means coupled to the stem displacement, actuating variable and environmental data digital representation means for storing the digital representations, and interface means for manually setting control parameters for the unit;
 mounting the stem displacement sensor adjacent the stem of the valve so that the output signal generated by the stem displacement sensor is responsive to the displacement of the stem;
 connecting the actuating variable sensor to the actuator;
 mounting the environmental data sensor adjacent the valve so that contaminant vapors emitted by the valve are monitored during changes in the actuating variable;
 varying the actuating variable to displace the stem; and
 setting the interface means to initiate the generation and storage of digitized data values indicative of the actuating variable, initiate the generation and storage of digitized data values indicative of the displacement of the stem, and initiate the generation and storage of digitized data values indicative of the environmental parameters.

25. The method of claim 24 including the steps of correlating the environmental data to stem displacement data or actuating variable data.

* * * * *